US008695218B2

(12) United States Patent
Scartozzi (10) Patent No.: US 8,695,218 B2
(45) Date of Patent: Apr. 15, 2014

(54) JOINT CONSTRUCTION FOR COUPLING CONDUIT SECTIONS

(71) Applicant: Allied Tube & Conduit Corporation, Harvey, IL (US)

(72) Inventor: Giulio Scartozzi, Chicago Heights, IL (US)

(73) Assignee: Allied Tube & Conduit Corporation, Harvey, IL (US)

( * ) Notice: Subject to any disclaimer, the term of this patent is extended or adjusted under 35 U.S.C. 154(b) by 0 days.

(21) Appl. No.: 13/717,110

(22) Filed: Dec. 17, 2012

(65) Prior Publication Data

US 2013/0106101 A1  May 2, 2013

Related U.S. Application Data

(62) Division of application No. 12/325,336, filed on Dec. 1, 2008, now abandoned, which is a division of application No. 11/147,123, filed on Jun. 7, 2005, now abandoned.

(51) Int. Cl.
*B21D 51/16* (2006.01)
(52) U.S. Cl.
USPC ............. 29/890.141; 29/890.14; 277/622; 285/226; 285/354; 285/369; 411/156

(58) Field of Classification Search
USPC .......... 29/890.14–890.149, 512; 72/316, 460; 137/247.49; 269/164; 277/622; 285/226, 354, 423, 369; 411/156
See application file for complete search history.

(56) References Cited

U.S. PATENT DOCUMENTS 4,165,110 A * 8/1979 Itzler ............................. 285/226

* cited by examiner

*Primary Examiner* — Richard Chang
(74) *Attorney, Agent, or Firm* — Kacvinsky Daisak Bluni PLLC (57) ABSTRACT

A joint construction includes first and second conduit sections having coaxially overlapping end areas. A coupling member has a first end received within the end of the first conduit section and a second end with external threads. A bore of the coupling member receives the second section end area. A plurality of protrusions are formed on an outer surface of the coupling member. The plurality of protrusions engage a plurality of complimentary features formed on the end area of the first conduit section. A gland nut has threads configured to engage the external threads of the second end of the coupling member. A washer is disposed on the second conduit section between the second end of the coupling member and the gland nut. The washer is configured to engage the end area of the second conduit section to resist relative axial movement between the first and second conduit sections.

20 Claims, 5 Drawing Sheets

JOINT CONSTRUCTION FOR COUPLING CONDUIT SECTIONS

This application is a divisional of application Ser. No. 12/325,336, filed Dec. 1, 2008, which is a divisional of application Ser. No. 11/147,123, filed Jun. 7, 2005.

FIELD OF THE INVENTION

The present disclosure relates to a joint construction for conduit, a coupling assembly for joining conduit, a connector sleeve for joining conduit, and to a method for joining conduit using a coupling assembly. It finds particular application in conjunction with electrical metallic tubing and will be described herein primarily by way of reference thereto; however, it will be appreciated that the invention finds utility in conjunction with all manner of conduits, including pipes, tubes, ducts, and the like.

BACKGROUND OF THE INVENTION

Electrical metallic tubing (EMT) is thin-wailed tubing used to contain is and protect electrical wires. EMT is commonly used in warehouses, gymnasiums, factories, and the like. Such conduit is traditionally manufactured in ten (10) foot lengths. The conduit sections can be connected end-to-end for use in applications requiring longer sections. Conduit connectors and conduit coupling assemblies are well known in the art. Many coupling designs require the use of a connection sleeve to hold the lengths of conduit together. These connectors are manufactured and shipped independently of the conduit and may require additional parts to assemble. Maintaining inventory of and installing the individual connector parts takes time and costs money. It would therefore be desirable to have a connector sleeve for use in joining conduit, a coupling assembly for joining conduit, and a method for joining conduit using a coupling assembly. The present invention provides connector sleeves, coupling assemblies, and methods which overcome the above-referenced problems and others.

SUMMARY OF THE INVENTION

In one aspect, a joint construction for conduit includes first and second sections of conduit having coaxially overlapping end areas, wherein the first section end area has an enlarged diameter relative to the second section end area. A coupling member is affixed to the first section end area and includes a first and second end portions. The first end portion is dimensioned to be coaxially received within the first section end area and the second end portion has external threads and axially extends from the first end portion. The coupling member includes an axial bore dimensioned to coaxially receive the second section end area. An annular gland nut includes internal threads rotatably engaging the external threads of the second end portion to selectively axially advance and retract the gland nut when the gland nut is respectively rotated in opposite directions. A compression washer circumscribes the second section and is interposed between the coupling member second end portion and the annular gland nut and is urged into engagement with the second section end portion to resist axial movement of the second section relative to the first section.

In another aspect, a coupling assembly for joining conduit includes a conduit having at least one swaged or enlarged diameter end, a connector sleeve, a compression washer, and an internally threaded annular gland nut. The end of a first conduit is swaged to form a bell portion. The bell portion is sized to receive a connector sleeve. The connector sleeve has an insertion end sized to fit within the bell portion of the first conduit, and an externally threaded second end sized to receive a second conduit. The insertion end of the connector sleeve is coupled within the bell portion of the first conduit. The internally threaded annular gland nut, sized to receive the threaded end of said connector sleeve and encircling a compression washer, is engaged onto the threaded end of the connector sleeve, thus completing the coupling assembly.

In yet another aspect, a connector sleeve for joining conduit includes an annular sleeve having a first end and a second end. The first end, or insertion end, has an outer diameter sized to be received by a first conduit. The second end, or receiving end, is externally threaded and has an inner diameter sized to receive a second conduit.

In still another aspect, a method for joining conduit using a connector assembly is provided. The end of a first conduit is swaged to receive a connector sleeve. The connector sleeve has an insertion end and an externally threaded second end. The connector sleeve is then coupled within the swaged end of the first conduit. A compression washer is encircled by an internally threaded annular gland nut. The compression washer and the gland nut are Wed over a second conduit. The end of the second conduit is then inserted into the connector sleeve. The gland nut, with washer, is then engaged onto the threaded end of the connector sleeve, thereby tightening the compression washer about the end of the second conduit.

One advantage of the conduit coupling assembly described herein resides in its ability to securely connect two lengths of conduit coaxially.

Another advantage of the embodiments of the invention described herein is found in that it offers a conduit joint which may resist twisting and/or separation of the coupled conduit sections. A further advantage of the coupling assembly described herein is found in that it may be provided as an integral part of the conduit. For example, the coupling assembly components may be preattached to the conduit sections prior to shipping the conduit sections to the job site, e.g., during manufacture, at a centralized location, etc. In this manner, manufacturing costs, installation time, and/or inventory concerns associated with maintaining separate inventories of conduit sections and couplers may be reduced.

Yet another advantage of the coupling assembly embodiments herein is the ease of which a connection between conduit sections may be assembled and disassembled.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings, wherein like reference numerals are used for like or analogous components throughout the several views, are only for purposes of illustrating preferred embodiments and are not to be construed as limiting the invention.

DETAILED DESCRIPTION OF THE PREFERRED EMBODIMENTS

With reference to the drawing figures, there appears a conduit joint construction 10 (FIG. 1) according to a first embodiment and a conduit joint construction 11 (FIG. 3) for connecting two conduit sections 12, 14 in coaxial, end-to-end fashion. The conduit 12 has at least one receiving end 18. The receiving end 18 is defined by a swaged or bell portion 20. The bell portion 20 has an enlarged diameter with respect to the conduit 34 is designed to receive a connector sleeve 22. The conduit is preferably electrical metallic tubing and may be formed of steel, aluminum or aluminum alloy, or other metal or metal alloy. Other conduit materials are also contemplated, such as PCV and other plastics.

The connector sleeve 22 has an externally threaded end 24 and an insertion end 26. Furthermore, the connector sleeve 22 defines an axial channel or bore having an internal diameter sized to receive an end of the second conduit 14. The insertion end 26 of the connector sleeve 22 can be coupled within the receiving end 18 of conduit 12 via any of a number of methods. For example, the coupling or fastening between the insertion end 26 of the connector sleeve 22 and the receiving end 18 of the conduit 12 can be achieved by a friction fit between the exterior-facing surface of the insertion end 26 and the interior-facing surface of the bell end 18, by a mechanical fastener such as one or more rivets, screws or other threaded fasteners, clips, clamps, or the like, a welded joint, an adhesive bond such as epoxy or other adhesive, roll grooving for conduit formed of PVC or other plastic, the connector sleeve may be secured to the bell end via a glue or adhesive bond, or alternatively, may be integrally formed or molded.

Figure 3:
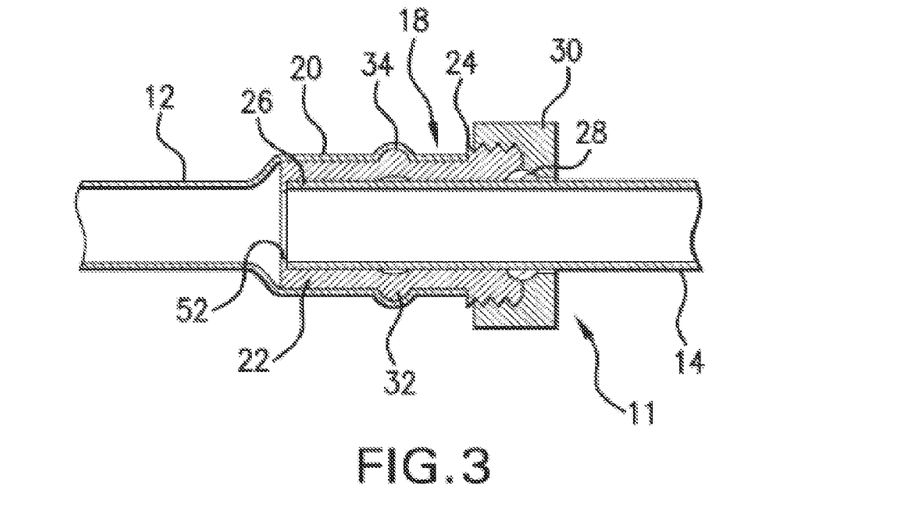
FIG. 3 is a side-sectional view of a pipe joint construction according to a second embodiment of the present invention.
Figure 4:
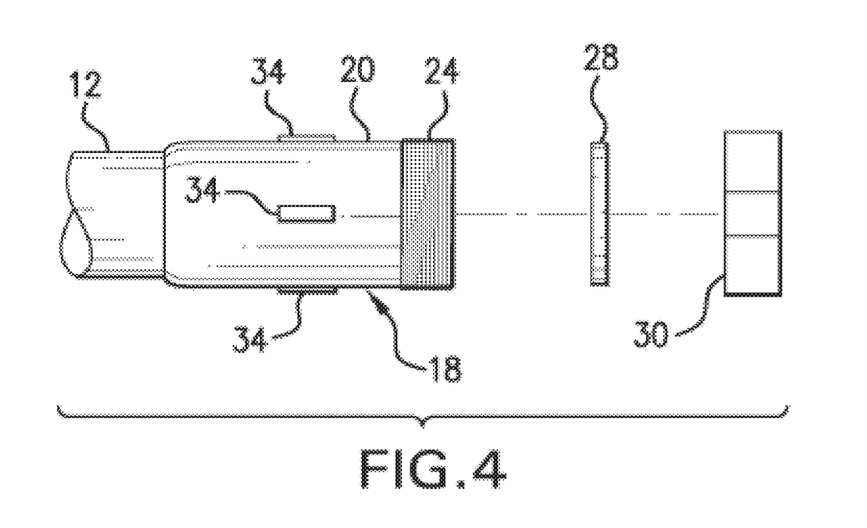
FIG. 4 is an exploded side view of the conduit and connector sleeve portions of the coupling assembly depicted FIG. 3.

In the embodiment appearing in FIGS. 3 and 4, the coupling member 22 is secured within the bell portion via outwardly dimpling or otherwise deforming the connector sleeve and bell portion 20 whereby one or more 20 protrusions are formed on the exterior-facing surface of the connector sleeve 22 which engage and are complimentary with a corresponding number of depressions formed in the inward-facing surface of the bell portion 20. However, inwardly dimpling or otherwise deforming the connector sleeve and bell portion 20 is also contemplated whereby one or more protrusions are formed on the interior-facing surface of the connector sleeve 22 which engage and are complimentary with a corresponding number of depressions formed in the outward-facing surface of the bell portion 20. In still further embodiments, the insertion end of the sleeve within may be rotatably coupled to the receiving end of the first conduit via external threads formed on the exterior facing surface of the insertion end 26 and complimentary mating internal threads formed on the interior facing surface of the bell portion 20.

Figure 1:
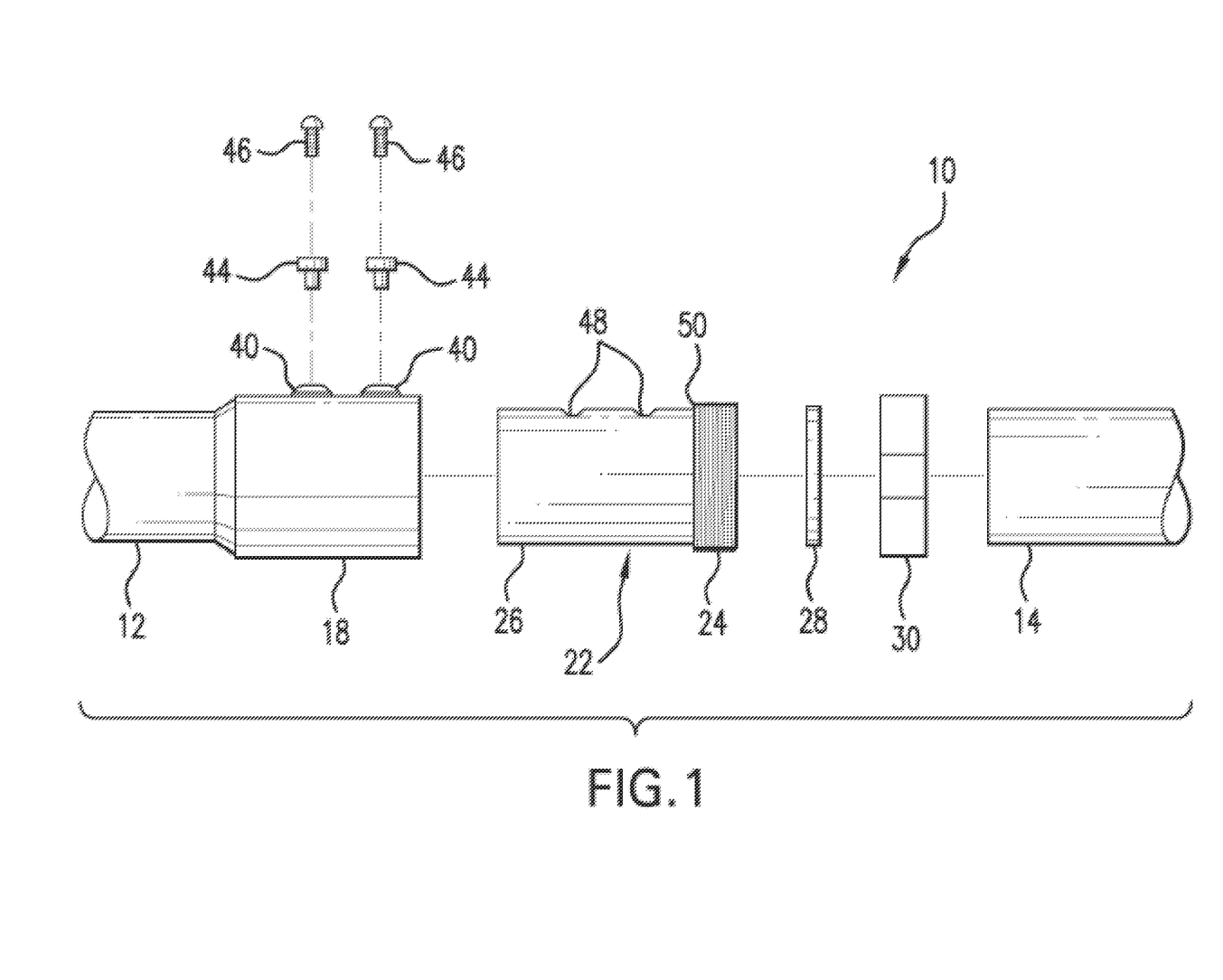
FIG. 1 is an exploded side view illustrating a coupling assembly according to a first embodiment of the present invention.
Figure 2:
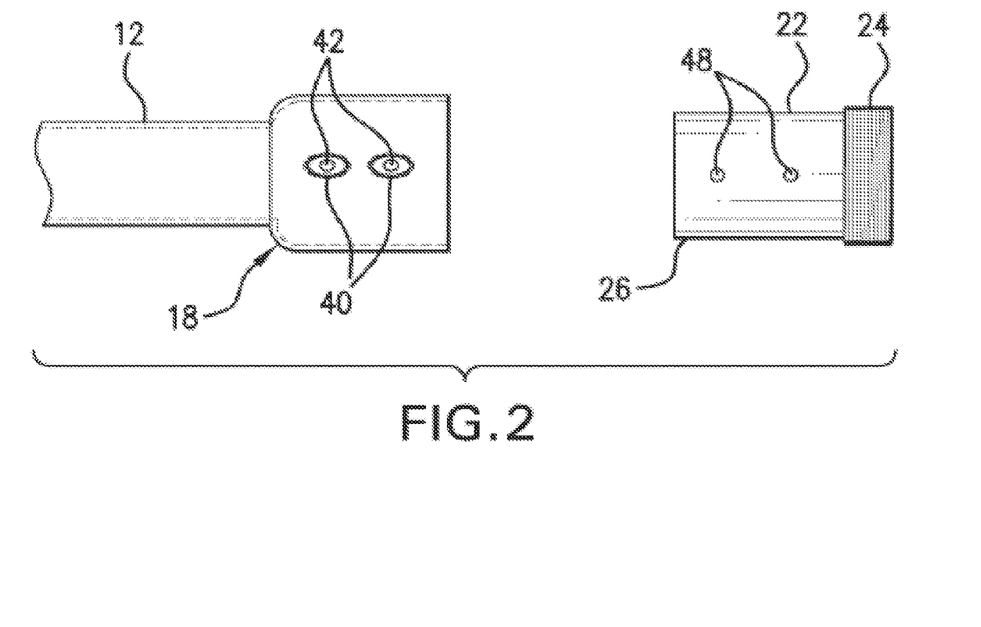
FIG. 2 is an exploded top plan view of the conduit and connector sleeve shown in FIG. 1.

With specific reference now to the embodiment shown in FIGS. 1 and 2, there is illustrated one method for securing the connector sleeve 22 within the receiving end 18. The bell portion 20 includes one or more (two in the depicted embodiment) dimples or protrusions 40 formed thereon. Each dimple 40 includes an opening 42 extending therethrough. A tubular rivet 44 having a threaded interior is then clinched on the top of each of the dimples 40 and through the holes 42. For each hole 42, there is a corresponding aligned hole 48 formed in the connector sleeve 22. A threaded fastener 46 is rotatably secured to each of the threaded rivets 44 and extends into the holes 48. Preferably, each of the holes 48 is tapped for form internal threads which likewise rotatably engage the threaded fastener 46.

It will be recognized that the depicted embodiment employing axially spaced apart fasteners is exemplary only and that other positions and configurations of fasteners may be provided. For example, in certain embodiments, only a single fastener may be provided. In other embodiments, two or more axially aligned fasteners, e.g., circumferentially spaced about the longitudinal axis of the connector sleeve 22 and bell portion 20, may be provided.

In certain embodiments, each threaded fastener 46 is preferably of a length such that the threaded end thereof will engage the opening 48 without extending into the interior portion of the connector sleeve 22, so as to avoid interfering with the received end of the conduit 14. In certain other embodiments, the threaded fasteners 46 are of a length which will extend into the interior of the connector sleeve 22. In such embodiments, the one or more fasteners may be positioned so as to avoid interfering with the received end of the conduit 14, e.g., behind an internal stop, or alternatively, the threaded end of one or more of the fasteners 46 may extend radially inwardly so as to define an internal stop, as described hereinbelow.

With specific reference now to FIGS. 3 and 4, there is shown an alternative means for coupling the connector sleeve 26 to the bell portion 20 wherein the connector sleeve 22 and the bell portion 20 are simultaneously outwardly deformed, e.g., via dimpling. By outwardly pressing the sleeve 22 and bell portion 20, one or more protrusions 32 are formed on the exterior-facing surface of the connector sleeve 22 which engage and are complimentary with a corresponding number of depressions 34 formed in the inward-facing surface of the bell portion 20.

It will be recognized that the depicted embodiment employing axially aligned, and radially spaced apart deformations is exemplary only and that other positions and configurations of the deformations may be provided. For example, in certain embodiments, only a single deformed region may be provided. In preferred embodiments, two or more axially aligned deformation, e.g., two, three, four, five, six, seven, eight, or more deformations circumferentially spaced about the longitudinal axis of the connector sleeve 22 and bell portion 20, may be provided.

Advantageously, where a plurality of radially spaced deformations are provided, preferably, e.g., from four to eight although other numbers are contemplated, the dimples or other deformations are formed in such a way so as to provide surface features, preferably protrusions, on the enlarged end area 18 so as to facilitate engagement by a gripping tool 100 such as a wrench, pliers, or the like. In this manner, during installation, the tool 100 may be used to engage the end area 18 to provide additional leverage and/or prevent rotation of the conduit 12 and the connector sleeve 22 relative to the gland nut 30 when the gland nut is rotated during assembly and disassembly of the pipe joint construction.

It will be recognized that by outwardly deforming the connector sleeve 22 and bell portion 20, interference with the inserted end of the conduit 14 during assembly, as well as interference with wiring or cabling to be drawn through the conduit, may be avoided. In certain other embodiments, however, the deformed regions may be dimpled or otherwise deformed inwardly. In such embodiments, the one or more deformed regions may be positioned so as to avoid interfering with the received end of the conduit 14, e-g., behind an internal stop, or alternatively, may be positioned so as to define an internal stop, as described hereinbelow. Such inward deformations are also preferably of a radial extent which does not interfere with wiring or cabling to be passed through the conduit.

With reference now to FIGS. 1 and 2 and continued reference to FIG. 3, a compression washer or gland 28 is sized to fit about the conduit 14 and to be coaxially received within an internally threaded annular gland nut 30. The compression washer may be formed of a metal or metal alloy, and preferably is formed of spring steel, or the like. The gland nut 30 is sized to rotatably receive the threaded end 24 of the connector sleeve 22. The washer 28 is compressed around the second conduit 14 as the gland nut 30 is rotatably tightened about the threaded end 24 of the connector sleeve 22. In an alternative embodiment, particularly wherein a PCV or other plastic conduit material is used, the compression washer may be replaced with an annular ring secured to the conduit 14, e-g., via an adhesive or glue bond, or other fastener.

The connector sleeve may optionally include an external stop for limiting the axial extent to which the connector sleeve 22 may be inserted into the bell portion 20. The external stop may be any protrusion formed on or attached to the connector sleeve 22 and positioned between the insertion end 26 and the threaded end 24 of the connector sleeve 22 to allow insertion of the connector sleeve 22 into the bell portion 20 to some maximum or predetermined depth. In the embodiments depicted in FIGS. 1-3, the shoulder 50 of the enlarged diameter threaded end 24 serves as an external stop, although other external stop member configurations such as one or more ridges or other protrusions, such as an annular ridge or a segmented series ridges, and the like, are also contemplated. Optionally, the external stop member can include a peripheral shape and/or one or more peripheral surface features adapted to be engaged by a wrench or other gripping tool.

The connector sleeve 22 may optionally include an internal stop for limiting the axial extent to which the conduit 14 may be inserted into the connector sleeve 22. The internal stop may be any protrusion extending into the axial bore defined by the connector sleeve 22 positioned therein to allow insertion of the conduit 14 into the bell portion 20 to a predetermined depth and prevent the inserted end of the conduit 14 from passing completely through the sleeve 22. Preferably, such an internal stop member should extend inwardly a sufficient distance to engage the edge of conduit end 14, but without interfering with cabling or wiring to be passed through the conduit. In the embodiment depicted in FIG. 3, the radially inwardly extending flange or lip 52 of the connector sleeve 22 serves as an internal stop member, although other internal stop member configurations are contemplated, including without limitation one or more fasteners ends additionally securing the connector sleeve 26 within the bell portion 20 as described above, or, one or more radially inwardly formed dimples or deformations for securing the connector sleeve 26 within the bell portion 20 as described above.

In still further embodiments, the connector sleeve 22 can have modified internal and/or external surface features so as to prevent relative rotation between the connector sleeve 22 and the bell portion 20 and/or relative rotation of the second conduit 14 within the sleeve 22. For example, the internal and/or external surfaces of the washer 28 may be crosshatched to increase the friction. Alternatively, the connector sleeve 22 may be keyed or otherwise provided with a complimentary cross-sectional shape relative to the bell portion and/or the inserted end of the conduit 14.

In certain embodiments, the compression washer 28 may have a beveled or tapered leading edge such that the washer 28 is wedged between the connector sleeve 22 and the second conduit 14 as the gland nut 30 is tightened via rotation of the nut 30 with respect to the threaded end 24. The inner and/or outer surfaces of the compression washer 28 may be modified to increase the friction between the compression washer 28 and the second conduit 14 and/or between the compression washer 28 and or the connector sleeve 22. For example, the internal and/or external surfaces of the washer 28 may be crosshatched to increase the friction.

Figure 5:
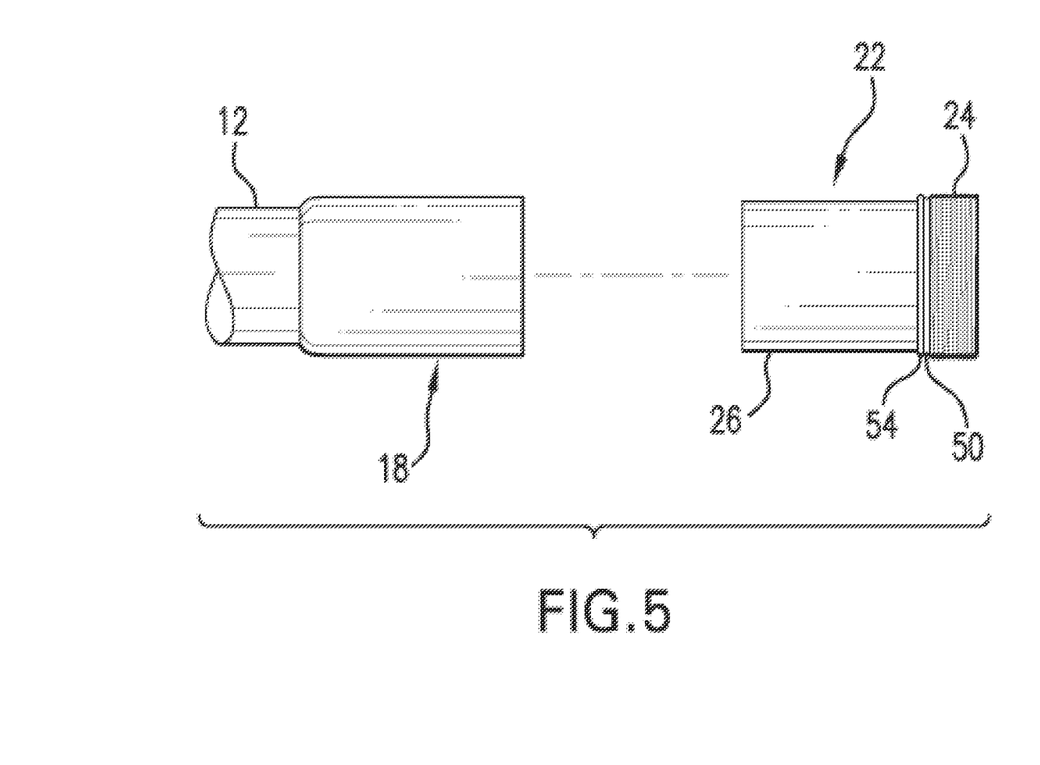
FIG. 5 is a side exploded view illustrating a coupling assembly according to a further embodiment.

Referring now to FIG. 5, there appears a conduit section 12 having an enlarged end 18 for receiving a connector sleeve 22. The connector sleeve 22 includes a threaded end 24, an insertion end 26, and a raised shoulder 50. It will be recognized that the coupling assembly depicted in FIG. 5 may include any of the fastening or coupling means for securing the sleeve 22 within the bell end 18 of the conduit 12 and described above.

An optional annular gasket or sealing ring 54 is supported on the sleeve insertion end 26. The material forming the sealing ring or gasket 54 may be, for example, a metal or metal alloy, such as steel, aluminum, zinc alloy, etc., or a synthetic or natural plastic, rubber, or elastomeric material. Optionally, the gasket 54 may be seated in an annular groove or channel (not shown) formed on the connector sleeve insertion end 22 adjacent the shoulder 50. The sealing ring or gasket 54 fills any gap between the shoulder 50 and the end of the bell portion 18, thereby preventing or reducing the infiltration of moisture, dirt, debris, smoke, and other environmental factors into or out of the conduit.

Figure 6:
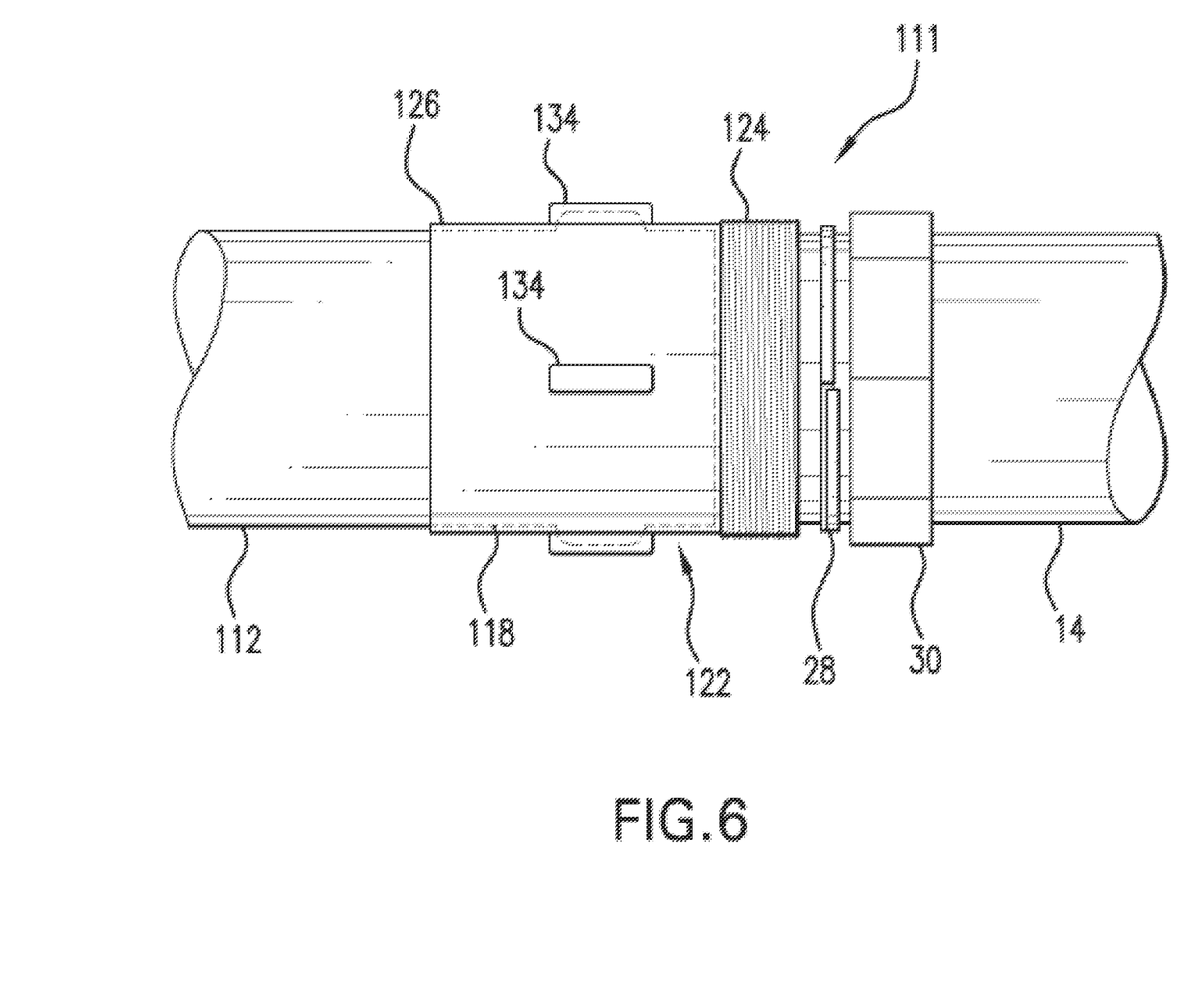
FIG. 6 is a side view of a coupling assembly according to yet another embodiment.

Referring now to FIG. 6, there appears a pipe joint assembly 111 including a conduit section 112 having an end 148 coaxially received within an insertion end 126 of an external sleeve 122, The sleeve 122 includes a threaded end 124 having an internal diameter sized to receive an end of a conduit section 14 to be joined to the conduit section 112. An internal stop member (not shown) for the received ends of the conduit sections 112 and 14, such as a radially inwardly protruding member or flange may be provided within the sleeve 122 intermediate the insertion end 126 and the threaded end 124 of the sleeve 122. An annular sealing ring or gasket (not shown) may optionally be provided to seal any gap between the outer surface of the insertion end 118 of conduit 114 and an inner surface of the sleeve 122.

A compression washer or gland 28 is sized to fit about the conduit 14 and to be coaxially received within an internally threaded annular gland nut 30. The gland nut 30 is sized to rotatably receive the threaded end 124 of the connector sleeve 122. The washer 28 is compressed around the second conduit 14 as the gland nut 34) is rotatably tightened about the threaded end 24 of the connector sleeve 22. The washer 28 may include a beveled or tapered leading edge to wedge the washer between the threaded end 124 of the sleeve 422 and the conduit section 14. In alternative embodiments, the compression washer 28 may be replaced with an annular ring secured to the conduit 14, e.g., via an adhesive or glue bond, or other fastener.

In the depicted exemplary embodiment, the connector sleeve 122 is secured to the conduit section 112 via a plurality of outward dimples or deformations 134. However, it will be recognized that any of the coupling methods shown and described above by way of reference to FIGS. 1-4 for securing the connector sleeve 22 to conduit section end 18 may likewise be adapted for securing the connector sleeve 122 to the conduit section end 118.

The invention has been described with reference to the preferred embodiments. Modifications and alterations will occur to others upon a reading and understanding of the preceding disclosure herein, whereby it is to be distinctly understood that the foregoing descriptive matter is to be interpreted merely as illustrative of the invention and not as a limitation.

What is claimed is:

1. A joint construction for coupling conduit sections, comprising:
   first and second conduit sections having coaxially overlapping end areas, the end area of the first conduit section having a diameter that is larger than a diameter of the end area of the second conduit section;
   a coupling member engaged with the end area of the first conduit section, the coupling member including:
      a first end dimensioned to be received within the end area of the first conduit section and a second end having external threads;
      a bore dimensioned to receive said second section end area; and
      a plurality of protrusions on an outer surface thereof engaged with a plurality of complimentary features on the end area of the first conduit section, the plurality of protrusions and plurality of complementary features formed by simultaneously outwardly deforming the coupling member and the end area of the first conduit section;
   a gland nut having threads configured to engage the external threads of the second end of the coupling member; and
   a washer disposed on the second conduit section between the second end of the coupling member and the gland nut, the washer configured to engage the end area of the second conduit section to resist relative axial movement between the first and second conduit sections.

2. The joint construction of claim 1, wherein the plurality of protrusions of the coupling member and the plurality of complimentary features of the first conduit section comprise a plurality of mutually deformed regions configured to prevent relative rotation between the coupling member and the first conduit section.

3. The joint construction of claim 1, wherein the plurality of protrusions of the coupling member and the plurality of complimentary features of the first conduit section comprise a plurality of mutually deformed regions configured to prevent relative axial movement between the coupling member and the first conduit section.

4. The joint construction of claim 1, wherein the plurality of protrusions comprise a plurality of radially spaced deformed regions.

5. The joint construction of claim 4, wherein the plurality of complimentary features comprise a plurality of deformed regions that are spaced about the circumference of the end area of the first conduit section.

6. The joint construction of claim 1, wherein the plurality of complementary features comprise protrusions that enable engagement with a gripping tool to prevent rotation of the first conduit section relative to the gland nut as the gland nut is rotated with respect to the external threads of the second end of the coupling member.

7. The joint construction of claim 1, wherein the first conduit comprises a belled portion configured to receive the first end of the coupling member.

8. The joint construction of claim 7, wherein the belled portion comprises an internal stop to limit an axial extent to which the coupling member can be inserted into the belled portion.

9. A joint construction for coupling conduit sections, comprising:
   first and second conduit sections having coaxially engageable end areas, the end area of the first conduit section comprising a belled portion for receiving the end area of the second conduit section;
   a coupling member including:
      a first end positioned within the belled portion of the first conduit section;
      a second end having external threads;
      a bore dimensioned to receive the end area of the second section; and
      a plurality of radially spaced protrusions engaged with a plurality of radially spaced complimentary features on the belled portion of the first conduit section, the plurality of radially spaced protrusions and plurality of radially spaced complementary features formed by simultaneously outwardly deforming the coupling member and the end area of the first conduit section;
   a gland nut having threads configured to engage the external threads of the coupling member; and
   a washer disposed on the second conduit section between the second end of the coupling member and the gland nut.

10. The joint construction of claim 9, wherein the plurality of radially spaced protrusions of the coupling member and the plurality of radially spaced complimentary features of the first conduit section comprise a plurality of mutually deformed regions configured to prevent relative rotation between the coupling member and the first conduit section.

11. The joint construction of claim 9, wherein the plurality of radially spaced protrusions of the coupling member and the plurality of radially spaced complimentary features of the first conduit section comprise a plurality of mutually deformed regions configured to prevent relative axial movement between the coupling member and the first conduit section.

12. The joint construction of claim 9, wherein the plurality of radially spaced protrusions comprise a plurality of deformed regions.

13. The joint construction of claim 12, wherein the plurality of radially spaced complimentary features comprise a plurality of deformed regions.

14. The joint construction of claim 9, wherein the plurality of radially spaced complementary features are configured to enable engagement with a gripping tool to prevent rotation of the first conduit section relative to the gland nut as the gland nut is rotated with respect to the external threads of the second end of the coupling member.

15. The joint construction of claim 9, wherein the belled portion comprises an internal stop to limit an axial extent to which the coupling member can be inserted into the belled portion.

16. A joint construction for coupling conduit sections, comprising:
   first and second conduit sections having coaxially engageable end areas, the end area of the first conduit section comprising a belled portion for receiving the end area of the second conduit section;
   a coupling member having a first end positioned within the belled portion and a second end having external threads, the coupling member further including a bore for receiving the end area of the second conduit section, and a plurality of radially spaced protrusions engaged with a plurality of radially spaced complimentary features formed on the belled portion of the first conduit section to prevent relative rotation between the coupling member and the first conduit section, the plurality of protrusions and plurality of complementary features formed by simultaneously outwardly deforming the coupling member and the end area of the first conduit section;

a gland nut positioned about the second conduit section, the gland nut having internal threads configured to engage the external threads of the coupling member; and a compression washer positioned between the second end of the coupling member and the gland nut.

17. The joint construction of claim 16, wherein the plurality of radially spaced protrusions and the plurality of radially spaced complimentary features comprise a plurality of mutually deformed regions.

18. The joint construction of claim 16, wherein the plurality of radially spaced complementary features comprise dimples configured to enable engagement with a gripping tool to prevent rotation of the first conduit section relative to the gland nut as the gland nut is rotated with respect to the external threads of the second end of the coupling member.

19. The joint construction of claim 16, wherein the belled portion comprises an internal stop to limit an axial extent to which the coupling member can be inserted into the first conduit section.

20. The joint construction of claim 16, wherein the belled portion comprises an internal stop to limit an axial extend to which the second conduit section can be inserted into the first conduit section.

* * * * *